(12) United States Patent
Wilson et al.

(10) Patent No.: US 12,713,104 B2
(45) Date of Patent: Aug. 18, 2026

(54) AUTOMATIC SUBTITLE ENABLING

(71) Applicant: Synamedia Limited, Staines Upon Thames (GB)

(72) Inventors: James Charles Wilson, Salisbury (GB); Iain David Cooke, Hampshire (GB); Charles Arthur George Nurser, Southampton (GB); James Robert Bushell, Southampton (GB); Paul Howard Rutland, Hampshire (GB)

(73) Assignee: Synamedia Limited, Maidenhead (GB)

( * ) Notice: Subject to any disclaimer, the term of this patent is extended or adjusted under 35 U.S.C. 154(b) by 0 days.

(21) Appl. No.: 18/438,328

(22) Filed: Feb. 9, 2024

(65) Prior Publication Data

US 2025/0260877 A1 Aug. 14, 2025

(51) Int. Cl.
*H04N 21/488* (2011.01)
*G10L 15/26* (2006.01)

(52) U.S. Cl.
CPC ......... *H04N 21/4884* (2013.01); *G10L 15/26* (2013.01)

(58) Field of Classification Search
CPC ............................ H04N 21/4884; G10L 15/26
See application file for complete search history.

(56) References Cited

U.S. PATENT DOCUMENTS 10,423,660 B1 * 9/2019 Heo ........................ G06F 16/30
2021/0064879 A1 * 3/2021 Gupta .............. G06V 30/19173
2024/0406316 A1 * 12/2024 De Filippis ............. H04M 3/48

* cited by examiner

*Primary Examiner* — Yassin Alata
(74) *Attorney, Agent, or Firm* — Fernando & Partners, LLP

(57) ABSTRACT

Techniques for automatic subtitle enabling are described herein. In various embodiments, one or more servers, which include processor(s) and non-transitory memory, receive an audio file and a subtitle file of a media content object, obtain, using speech-to-text, transcription of the audio file and one or more confidence scores for one or more portions of the transcription. The server(s) then determine one or more similarity scores representing similarities between the one or more portions of the transcription and one or more corresponding portions in the subtitle file, and derive a clarity score for each of the one or more portions in the subtitle file based on the one or more similarity scores and the one or more confidence scores, wherein when playing the media content object, display of each of the one or more corresponding portions in the subtitle file is enabled based at least in part on the clarity score.

20 Claims, 7 Drawing Sheets

(a)

Low Clarity
310-2
320-2
330-2
subtitle 2
without automatic subtitle enabling (b)

Figure 2:
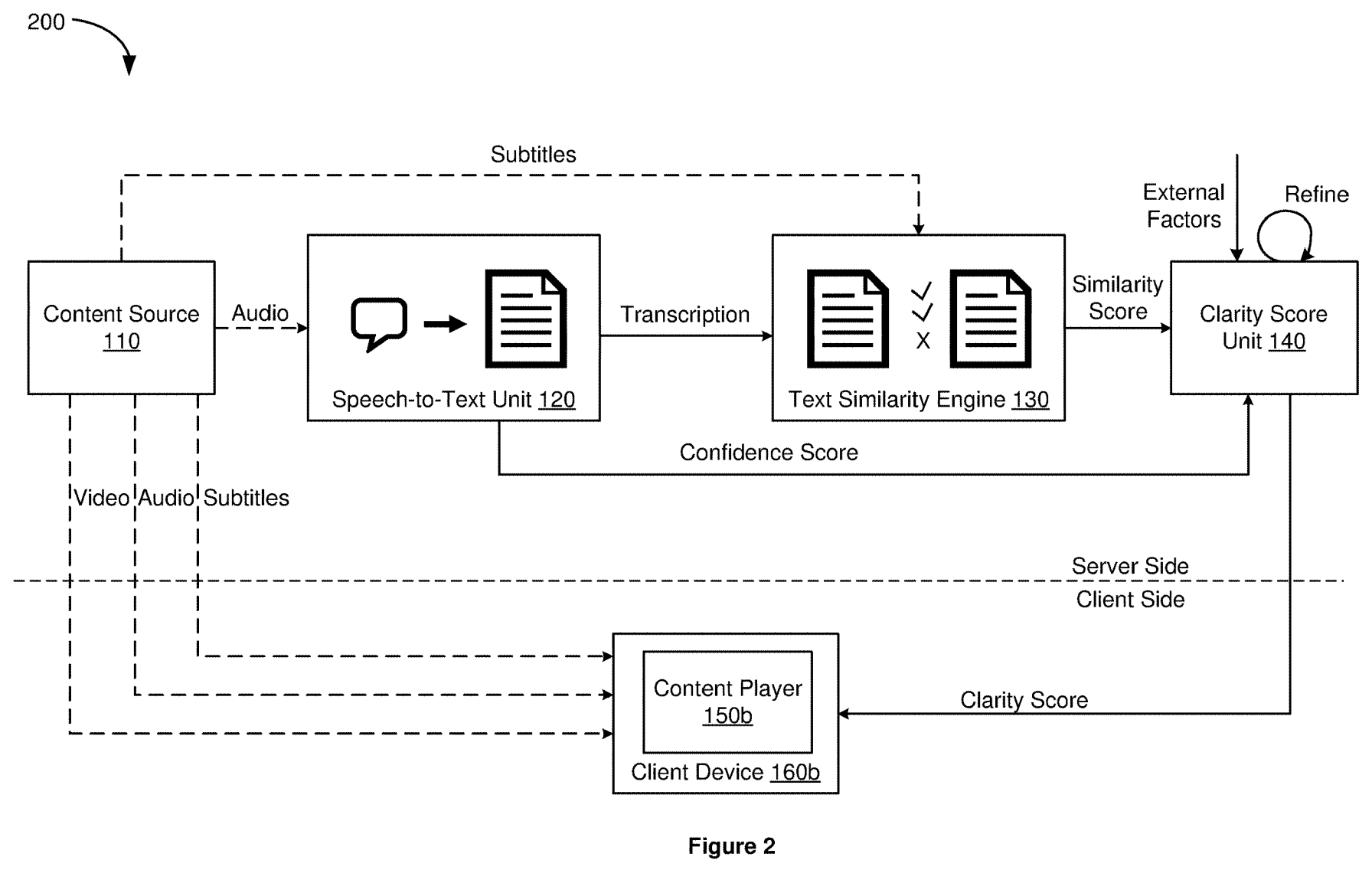

200

Content Source 110

Audio

Video

Audio

Subtitles

Subtitles

Speech-to-Text Unit 120

Transcription

Text Similarity Engine 130

Confidence Score

Similarity Score

Clarity Score Unit 140

External Factors

Refine

Server Side

Client Side

Clarity Score

Content Player 150b

Client Device 160b

Identify one or more portions of the media content object associated with the one or more portions in the subtitle file; obtain statistics of user interactions with the one or more portions of the media content object; and revise the clarity score based on the statistics of the user interactions ~550

B

Revise the clarity score based on one or more of characteristics of the media content, production properties of the media content, and an operator preference ~552

C

Rewrite the subtitle file to adjust alpha component of each of the one or more corresponding portions in the subtitle file according to the clarity score and an enabling threshold for determining the display of each of the one or more corresponding portions in the subtitle file ~554

D

Generate multiple subtitle files based on the subtitle file, wherein each of the multiple subtitle files is associated with a different enabling threshold for determining the display of each of the one or more corresponding portions in each of the multiple subtitle files ~556

E

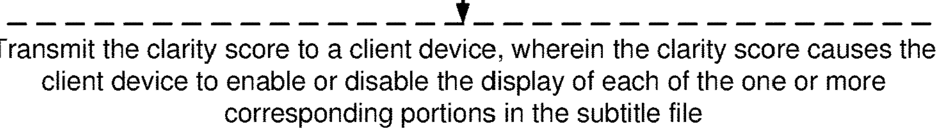
Transmit the clarity score to a client device, wherein the clarity score causes the client device to enable or disable the display of each of the one or more corresponding portions in the subtitle file ~558

Figure 5B

AUTOMATIC SUBTITLE ENABLING

TECHNICAL FIELD

The present disclosure relates generally to multimedia content processing and, more specifically, to automatic enabling of subtitles in multimedia content.

BACKGROUND

Subtitles are text representations of audio content in multimedia, such as films and television shows, intended for broadcast and streaming. Subtitles provide transcriptions or translations of spoken dialogue, aiding individuals with hearing difficulties or those who find the content hard to understand. While subtitles are beneficial, they can also disrupt the viewing experience. Users can currently toggle subtitles "on" or "off" and may have additional options for customizing the visual presentation, including font and color choices, etc. However, when enabled, viewers often find that reading subtitles distracts them from the visuals and worry about missing crucial moments. Conversely, disabling subtitles may lead to missing key spoken phrases, especially when the audio is unclear due to strong accents, background noise, or the increasing use of mumbling for artistic effect. Viewers typically resort to rewinding for a second listen, manually enabling subtitles, or increasing the volume, which can be cumbersome.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIG. 2 is a diagram illustrating another exemplary content delivery platform client side facilitating automatic subtitle enabling in accordance with various embodiments, in accordance with some embodiments;

FIGS. 5A and 5B are flowcharts illustrating a method for automatic subtitle enabling, in accordance with some embodiments.

Figure 1:
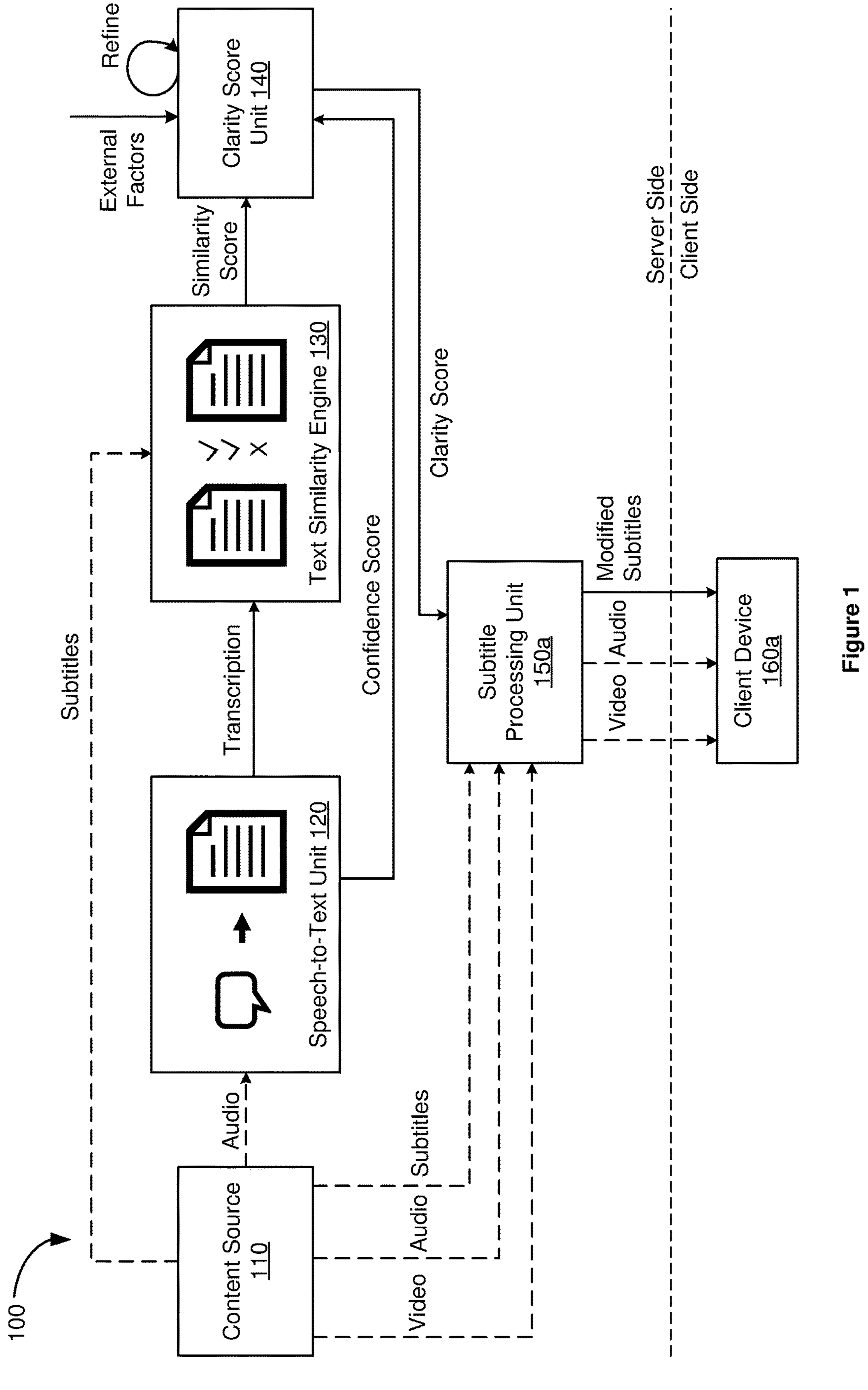
FIG. 1 is a diagram illustrating an exemplary content delivery platform with automatic subtitle enabling on the server side, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Methods, devices, and systems described herein utilize machine learning (ML) to assess the ability to perceive what is being said. Based on a clarity score, subtitles for specific words, phrases, and/or sentences are automatically enabled in accordance with various embodiments. Such features allow viewers to see subtitles when necessary and hides them the rest of the time. Users can also adjust sensitivity levels to have more or fewer subtitles shown. In some embodiments, a speech-to-text (STT) engine provides a confidence score for each word, phrase, or sentence. Sometimes, in media content such as TV shows or movies, the confidence score may be high, but the word is subtly incorrect. To address this issue, an additional text similarity ML engine is used to compare the original subtitle text with the STT output. This similarity factor is then used to drive the subtitling enablement. In some embodiments, various systems described herein rewrite the subtitle track to adjust the alpha component of subtitles. The adjustment enables the showing and hiding of subtitles without introducing additional player functionalities. As a result, in some embodiments, once the subtitles are turned on, e.g., either by the viewer or by the server, and the systems described herein automatically determine whether certain portions of the subtitles are shown (opaque) or hidden (transparent) for improved user experience.

In accordance with various embodiments, an automatic subtitle enabling method is performed at one or more servers that include one or more processors and non-transitory memory. The server(s) receive an audio file and a subtitle file of a media content object. The server(s) then obtain, using speech-to-text, transcription of the audio file and one or more confidence scores for one or more portions of the transcription. The server(s) further determine one or more similarity scores representing similarities between the one or more portions of the transcription and one or more corresponding portions in the subtitle file. The server(s) additionally derive a clarity score for each of the one or more portions in the subtitle file based on the one or more similarity scores and the one or more confidence scores, wherein when playing the media content object, display of each of the one or more corresponding portions in the subtitle file is enabled based at least in part on the clarity score.

Example Embodiments

Some platforms leverage cloud services to assess the clarity of audio in media content. Content providers or owners upload audio data and subtitle tracks of each media content item requiring analysis. The cloud services typically provide metadata describing the perceptibility of the audio data corresponding to each subtitle. To assess the perceptibility, upon receiving the audio data and the corresponding subtitle tracks, the cloud services use a speech-to-text (STT) service to convert the audio track to a text track. The STT service may be part of the cloud service or sourced from a third party. Current commercial STT services often inaccurately transcribe poor-quality dialogues, as they are generally trained on high-quality dialogues. When presented with unclear audio, the STT, for each word, typically produces one of the following results:

incorrectly transcribing the word and producing a low confidence score;

incorrectly transcribing the word but providing a high confidence score;

correctly transcribing the word but producing a low confidence score; or not recognizing any speech in the audio and producing no output.

As shown above, in addition to transcribing the word, the STT also outputs a confidence score, which is a numerical measure that represents the speech recognition system's level of certainty or confidence in the accuracy of the transcribed text, e.g., expressed as a percentage or a decimal value between 0 and 1. In other words, it indicates the likelihood that the recognized transcription is correct for a particular portion of the corresponding audio, e.g., time range(s), word(s), phrase(s), sentence(s). A high confidence score indicates that the STT is highly confident that the transcription accurately represents the speech. This typically occurs when the input speech is clear, well-pronounced, and/or matches the patterns that the system was trained on. A low confidence score, on the other hand, indicates that the STT is less certain about the accuracy of the transcription. Low confidence scores occur in situations with background noise, accents, or other factors that make the speech recognition task more challenging. In some cases, the STT does not provide a confidence score, indicating that it is unable to make a reliable assessment of the transcription accuracy.

Also as shown above, when transcribing unclear audio, relying solely on confidence scores is an inaccurate method for determining the audio clarity. This inaccuracy arises because confidence scores are relative and can vary based on the complexity of the speech, the quality of the audio input, and/or the capabilities of the underlying speech recognition system. Methods, devices, and systems described herein thus improve the accuracy of audio clarity determination for automatic subtitle enabling by grouping together words from STT outputs (e.g., using timing information from the original subtitle track for the start and end of each subtitle) as a string (e.g., the "transcribed subtitle") and using an additional text similarity machine learning (ML) engine to compare the transcribed subtitle with the original subtitle text. In some embodiments, the text similarity ML engine compares the two pieces of text for semantic similarity and returns a similarity score to determine subtitle enablement.

In some embodiments, the ML engine refines the similarity score based on external factors, ensuring continuous improvement in the automatic subtitle enabling service's relevance for customers. Moreover, when subtitles are selectively enabled using the techniques described herein, they become less distracting to viewers, thereby enhancing an operator's platform stickiness for the viewers. The automatic subtitle enabling techniques described herein also help operators fulfill legal accessibility requirements and can be applied to check audio clarity in new titles. Particularly in video-on-demand (VOD) content, where dialogues often exhibit a higher level of artistic creativity, the automatic subtitle enabling techniques described herein identify such dialogues and selectively enable subtitles for words, phrases, and/or sentences that are less clear for improved user experience in perception and understanding.

FIG. 1 is a diagram illustrating an exemplary content delivery platform 100 with automatic subtitle enabling on the server side in accordance with various embodiments. While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions of the modules described below can be combined into one or more modules and/or further sub-divided into additional sub-modules; and, that the modules described below are provided as merely one example configuration of the various aspects and functions described herein.

As a non-limiting example, in some embodiments, the exemplary content delivery platform 100 includes a content source 110 for providing media content items (also referred to hereinafter as "media content", "multimedia content", "media content objects", or "content"). Each media content item from the content source 110 can include video, audio, and subtitle data. Such data are encoded, packaged, stored, and/or transmitted accordingly to various formats and/or standards. In some embodiments, the subtitle data are available as text or converted into text from images (e.g., applying optical character recognition on imaged prerendered subtitled) for the purpose of automatic subtitle enabling. Further, in some embodiments, the subtitle data are available to be enabled and disabled by the viewer, e.g., closed subtitles.

For example, in Moving Picture Experts Group (MPEG) Phase 4 (MPEG-4) format, visual data, audio data, and subtitle data can be encoded into multiple streams and packaged together to create a multimedia file for streaming. In particular, subtitles are represented as text in a standardized format such as Timed Text Markup Language (TTML). Subtitles are synchronized with the visual-audio content based on time information, ensuring that they appear at the right moments during playback. The encoded video, audio, and subtitle streams are synchronized and streams as a package, thus allowing them to be played back together seamlessly. MPEG-4 supports the inclusion of additional tracks for multiple audio languages, alternative video angles, or other metadata. As used herein, the terms "stream", "file", and "track" are used interchangeably.

It should be noted that multiplexing is not necessary, and the subtitles can be represented in various formats according to various standards and/or protocols. For instance, in Dynamic Adaptive Streaming over HTTP (DASH), also known as the MPEG-DASH streaming technology, video, audio, and subtitles are typically kept in separate files so that the client downloads independently and synchronizes based on a common time reference encoded in each file. It should also be noted that a subtitle itself is a self-contained block or string of one or more words that that forms a phrase or sentence. A subtitle file thus includes subtitles for the media content (e.g., a TV show or a movie, etc.) along with timing information such that subtitles can be synchronized with the video and/or audio.

In some embodiments, the content delivery platform 100 has server-side subtitle process prior to delivering the content to a client device 160*a*. In some embodiment, the server-side subtitle processing components include a STT unit 120, a text similarity machine learning ML engine 130 (also referred to hereinafter as "the text similarity engine 130"), a clarity score unit 140, and a subtitle processing unit 150*a* in the cloud for automatic subtitle enabling. In some embodiments, the STT unit 120 obtains an audio file from the content source 110 and applies speech recognition techniques to derive transcription of the audio. In addition to deriving the transcription, as described above, the STT unit 120 also outputs confidence score(s).

In speech-to-text transcription, the smallest unit is typically a phoneme, e.g., the smallest units of sound in a language that can distinguish words from each other. In practical STT applications, where the goal is to understand the meaning of spoken language, the transcription is often done at the level of words and sometimes at the level of smaller units like sub-word units or characters. As such, in some embodiments, the STT unit 120 processes the audio data and converts the spoken words and/or sub-word units into a text representation. When processing the audio data, in some embodiments, the STT unit 120 also associates the transcribed text with timestamps to align with the audio data.

In some embodiments, the transcription outputted from the STT unit 120 is sent to the text similarity engine 130, which provides similarity service that is part of the cloud service or a third-party service. In some embodiments, the text similarity unit 130 groups together the words in the transcription output according to timestamps in the subtitle file from the content source 110 and compares the grouped words with the words in the original subtitle file to derive similarity score(s). The text similarity unit 130 then sends the similarity score(s) to the clarity score unit 140.

In some embodiments, the ML model for the text similarity unit 130 is based on a database of word associations and learning semantic similarities. In some embodiments, training the ML model includes comparing multiple texts describing the same subject to learn which features suggest commonality in the text. The text similarity unit 130 then uses the trained ML model to derive the similarity score(s). It should be noted that techniques in place of or in combination with ML text similarity models can be used for comparing the transcription output with the original subtitle file to derive similarity score(s).

In some embodiments, the clarity score unit 140 combines the confidence score and the similarity score to derive the clarity score for a respective sub-word unit, a word, or a group of words (e.g., a phrase or a sentence). Table 1 below shows sample rules for determining the clarity score based at least in part on the confidence score and the similarity score.

TABLE 1

| Confidence Score | Similarity Score | Clarity Score |
|---|---|---|
| High | High | High |
| High | Low | Low |
| Low | High | Low |
| Low | Low | Low |
| No output | Low | Low |

As shown in Table 1, in some embodiments, a low confidence score or a low similarity score results in a low clarity score. For example, when the confidence score of transcribing a word is lower than a first threshold or the similarity score of the transcribed word to the word in the original subtitles is lower than a second threshold, the clarity score unit 140 sets a low clarity score for the word. In contrast, if both the confidence score and the similarity score for a sub-unit of a word, a word, or a group of words are high, the corresponding clarity score is also high. In some embodiments, instead of the threshold-based approach described above, the clarity score unit 140 applies a function to the confidence score and the similarity score to derive a clarity score. In some embodiments, the clarity score unit 140 applies different weights to the confidence score and the similarity score to correct for differences between their calculations instead of or in addition to using different thresholds for deriving the clarity score.

In some embodiments, the clarity score is continually refined based on external factors, such as the operator's preferences. In some other embodiments, the external factors include characteristics of the media content, such as the content type, the involvement of actors, directors, and/or studios in the production, etc. In some embodiments, an operator applies an adjustment to the server configuration, such as multiplying the clarity score by a scaling factor and/or adding a bonus factor to the clarity score in accordance with the operator's preferences.

In some embodiments, the operator's preferences include known biases to the media content that require adjustments to match other content in the operator's asset catalogue. For example, dialogues in movies by a particular actor or director are harder to hear or understand and require a reduction applied to the clarity score as compared to other actors or directors. In some embodiments, further refinement of the clarity score includes applying server configurations based on the operator's preferences, the characteristics of the audio track in the media content, and/or the usage statistics. For example, movies from a particular producer use a different sound mix that makes it louder than other movies, thus affecting the clarity score based on the assumption that viewers will be turning down the volume. To refine the clarity score for automatic subtitle enabling, the clarity score is adjusted for the subtitles from such movies to compensate for the refinement in consideration of the usage statistics.

In some embodiments, further refinement of the clarity score is achieved by considering usage statistics, such as users rewinding and replaying sections of content, turning up or down the volume, enabling subtitles mid-viewing, and/or user satisfaction scores. In some embodiments, the clarity score unit 140 collects metrics across time periods for an asset to identify portions of the asset for clarity score refinement. For example, the clarity score unit 140 collates reports from multiple playback sessions of users turning on or off subtitles during each minute of content. The metrics collection allows hotspots to be discovered, e.g., a starting point and an ending point of turning off subtitles across multiple playback sessions corresponding to increased clarity score for a portion of the media content, or a starting point and an ending point of turning on subtitles across multiple playback sessions corresponding to decreased clarity score for a portion of the media content. In another example, rewinding and/or replaying sections can be linked to reducing the clarity scores for specific time ranges based on the assumption that such sections are hard to understand, e.g., applying a negative weighting to the clarity score for minute 37 of the media asset, which was played 5% more frequently than expected. In yet another example, upon detecting that a significant percentage of viewers enable subtitles at approximately the same time range, e.g., 17 minutes into the movie, the clarity score unit 140 reduces the clarity score from that point on based on the assumption that many viewers found the audio unclear just before enabling subtitles themselves. Equally, disabling subtitles at approximately the same time range by a significant percentage viewers can be used by the clarity score unit 140 as a signal to increase the clarity score corresponding to the time range.

Based on the clarity score, in some embodiments, the subtitle processing unit **150*a* on the server side modifies subtitle track(s) and sends the original video data, the original audio data, and the modified subtitle track(s) to the client device 160***a*. To generate the modified subtitles, in some embodiments, the subtitle processing unit 150*a* rewrites the subtitle track (e.g., a TTML subtitle track) to adjust the alpha component of subtitles based on the clarity score. This adjustment enables the showing or hiding of subtitles without introducing any additional functionality to the player on the client device 160*a*. For example, based on a high clarity score associated with a first portion of the subtitle, the show/hide property of the first portion in the TTML subtitle track is set to transparent (e.g., setting alpha value to 0—hiding). Conversely, with a low clarity score associated with a second portion of the subtitle, the show/hide property of the second portion in the TTML subtitle track is set to opaque (e.g., setting alpha value to 1—showing).

In some embodiments, the modified subtitle track is turned on automatically before content delivery. In some other embodiments, the viewer at the client device 160*a* manually turns on subtitles. In either case, the modified subtitles indicate whether a respective portion in the subtitles is shown (opaque) or not (transparent). In some embodiments, as will be described in further detail below, multiple subtitle tracks are available, allowing the viewer to choose from options with varying thresholds, ranging from "nearly always on" to "nearly always off". This approach is cost-effective, suitable for broadcast environments, and requires no player integration.

FIG. 2 is a diagram illustrating another exemplary content delivery platform 200 with client side facilitating automatic subtitle enabling in accordance with various embodiments. The platform 200 illustrated in FIG. 2 is similar to and adapted from the system 100 illustrated in FIG. 1. Accordingly, elements common to FIGS. 1 and 2 include common reference numbers, and the differences between FIGS. 1 and 2 are described herein for the sake of brevity. Again, while pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions of the modules described below can be combined into one or more modules and/or further sub-divided into additional sub-modules; and, that the modules described below are provided as merely one example configuration of the various aspects and functions described herein.

Similar to the platform 100 in FIG. 1, the platform 200 includes the content source 110, the STT unit 120, the text similarity engine 130, and the clarity score unit 140 on the server side. As described above with reference to FIG. 1, these components are configured to transcribe audio data, output a confidence score of the transcription, compare similarities between the transcription and the original subtitles to generate a similarity score, determine a clarity score based on the confidence score and the similarity score, and continually refine the clarity score based on external factors. Different from the platform 100, as a non-limiting example, the platform 200 does not include a subtitle processing unit on the server side. Instead, the clarity score determined by the clarity score unit 140 is sent to the client device 160*b* and directly utilized by a content player 150*b* on the client device 160*b*. This approach allows for fine-grained sensitivity control by the user.

In some embodiments, the clarity score is provided out-of-band with suitable timing information to the client device 160*b*. In such embodiments, the content player 150*b* applies the clarity score to the corresponding subtitles data based on the timing information (e.g., presentation timestamps) and adjusts display properties of relevant subtitle portions according to the clarity score for automatic subtitle enabling. In some other embodiments, though not shown in FIG. 2, the clarity score is included as additional metadata within the respective subtitle track while preserving the original subtitle data. For example, the server side can provide the original video, audio, and subtitle data to the client side and has extra metadata attached to the data so that the content player 150*b* on the client device 160*b* can use the clarity score in the extra metadata to decide whether to show the subtitle data.

Figure 3:
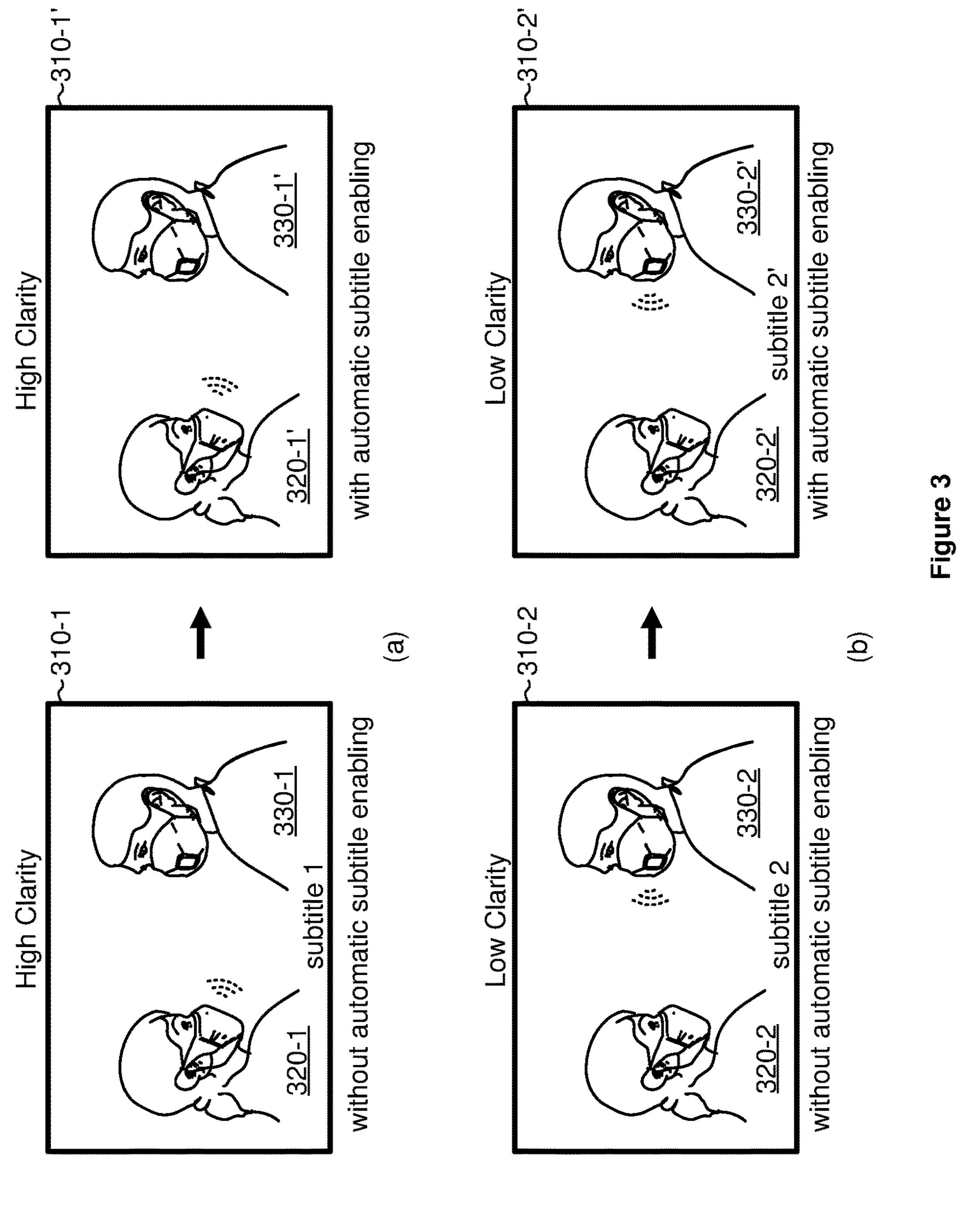
FIG. 3 is a diagram illustrating the display of subtitles with and without automatic subtitle enabling, in accordance with some embodiments.

FIG. 3 is a diagram 300 illustrating the display of subtitles with and without automatic subtitle enabling. The images in FIG. 3 illustrate video frames 310-1, 310-1', 310-2, and 310-2'. In (a), on the left, when the subtitles setting is toggled to "on" by the user without the automatic subtitle enabling feature, subtitle 1 is shown when one character 320-1, wearing a thin mask, talks to another character 330-1 in the scene displayed in the frame 310-1. Without the automatic subtitle enabling described herein, subtitle 1 is shown as long as the user turns on the subtitles setting, even though the speech by the character 320-1 is clear, e.g., a high clarity score associated with the speech by the character 320-1. In comparison, also in (a), on the right, the scene shown in the frame 310-1' is similar to the one shown in the frame 310-1, e.g., one character 320-1' wearing a thin mask talking to another character 330-1'. However, with automatic subtitle enabling, even if the subtitles setting is toggled to "on" by the user, no subtitle is displayed when the clarity score is high, e.g., the speech by the character 320-1' can be heard clearly through the thin mask.

In (b), on the left, when the subtitles setting is toggled to "on" by the user without the automatic subtitle enabling feature, subtitle 2 is shown when one character 330-2, wearing a thick mask, talks to another character 320-2 in the scene displayed in the frame 310-2. Without the automatic subtitle enabling described herein, subtitle 2 remains visible as long as the user enables the subtitles setting, irrespective of the clarity of the speech. In comparison, also in (b), on the right, the scene in the frame 310-2' is akin to the one shown in the frame 310-2. With automatic subtitle enabling, subtitle 2' is displayed when the clarity score is low, indicating that the speech by the character 330-2 is muffled and may not be heard clearly through the thick mask.

In some embodiments, as will be described in further detail with reference to FIG. 4, subtitle 2' is a portion of subtitle 2, e.g., a word, a phrase, and/or a sentence of the speech associated with the low clarity score. FIG. 3 illustrates that, with automatic subtitle enabling described herein, subtitles are automatically rendered for the low clarity scores and not displayed when the audio is unambiguously audible. The automatic display or concealment of subtitles, or a portion thereof, assists viewers in capturing key spoken words, phrases, or sentences without causing distraction from the visuals when the speech is clear and easy to understand. The automatic subtitle enabling thus improves user experience, e.g., without user intervention, automatically displaying a portion of the subtitles associated with a low clarity score and hiding another portion the subtitles associated with a high clarity score.

Figure 4:
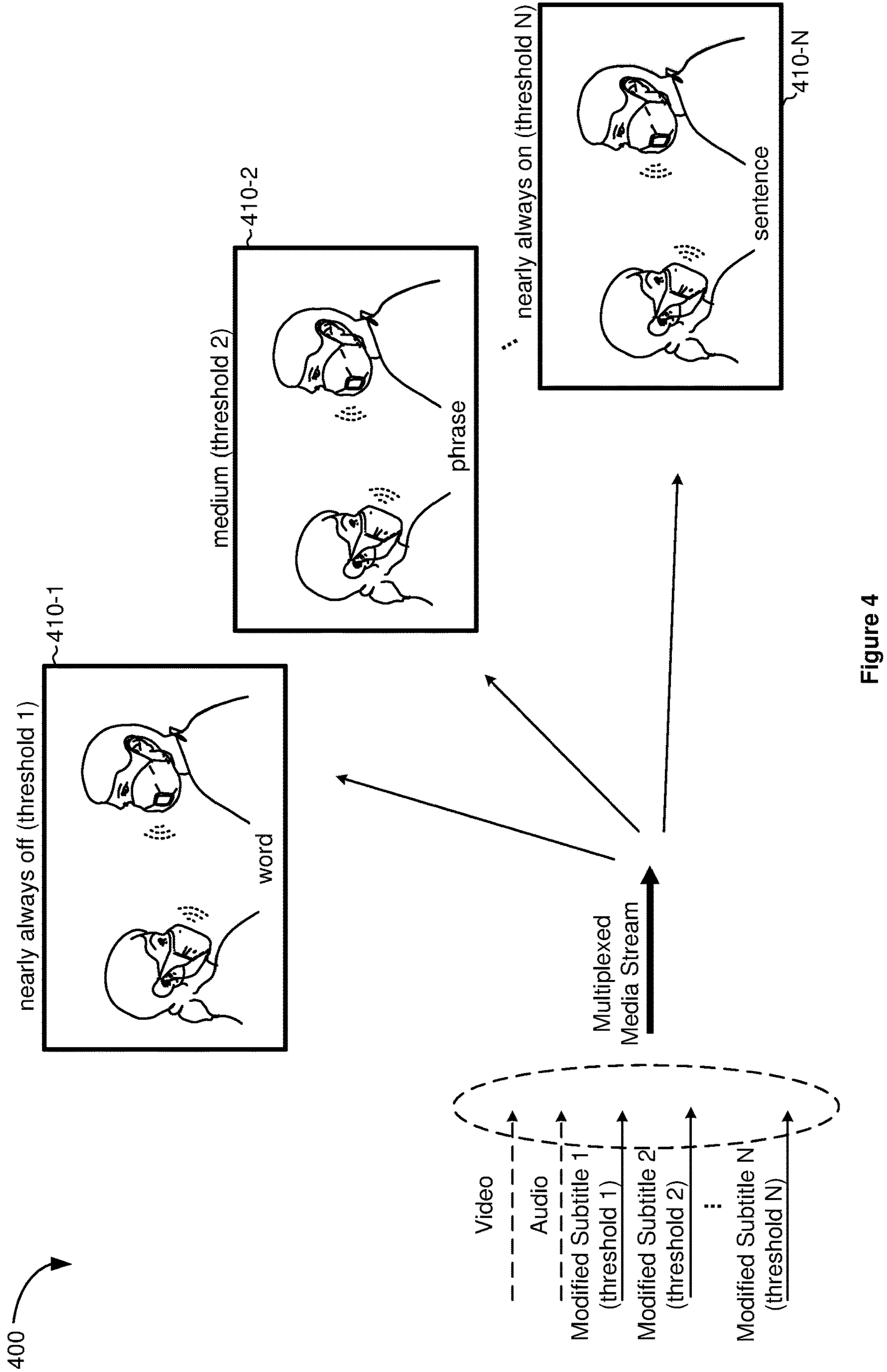
FIG. 4 is a diagram illustrating various threshold configurations for automatic subtitle enabling, in accordance with some embodiments.

FIG. 4 is a diagram 400 illustrating various threshold configurations for automatic subtitle enabling in accordance with some embodiments. In some embodiments, using the server-side subtitle processing illustrated in FIG. 1, several modified subtitle tracks are made available for selection by the client. These tracks have different thresholds, corresponding to a range, e.g., from "nearly always on" to "nearly always off". In some embodiments, in the metadata of the subtitle files, the subtitle processing unit 150*a* (FIG. 1) specifies the label for the threshold, e.g., specifying "nearly always on" in the metadata element for modified subtitle file N, specifying "medium" in the metadata element for modified subtitle file 2, or specifying "nearly always off" in the metadata element for modified subtitle file 1, etc. This approach is cost-effective and suitable for broadcast environments, requiring no content player integration. In FIG. 4, video data, audio data, and several modified subtitle files, e.g., modified subtitle file 1, modified subtitle file 2, . . . , modified subtitle file N, etc., are multiplexed to form a multiplexed media stream for delivery to the client device. Though as described above with reference to FIG. 1, multiplexing is not required for the delivery of the multiple subtitle files in accordance with various media content delivery protocols.

In some embodiments, each modified subtitle file is associated with a different threshold, e.g., threshold 1 is associated with modified subtitle file 1, threshold 2 is associated with modified subtitle file 2, . . . , threshold N is associated with modified subtitle file N, etc. During the preparation of these modified subtitle files, the subtitle processing unit 150*a* (FIG. 1) compares clarity scores with various thresholds for determining whether to show or high the display of various portions of subtitles. For instance, the alpha component of each portion is set based on whether the clarity score relative to the associated threshold meets a specified criterion. Consequently, different thresholds result in varying amounts of subtitles configured for displayed in different modified subtitle files. In some embodiments, the threshold is configured by the subtitle processing unit 150*a* (FIG. 1) and the adjustable based on external factors, e.g., the operator's preferences, usage statistics, and/or characteristics of the audio track, etc. Further in some embodiments, in configurations as shown in FIG. 2, the server side and/or the client side can configure the threshold and the threshold can be communicated between the server side and the client side out of band or carried as additional metadata within the subtitle track.

In some embodiments, the content players on the client devices 410 (e.g., client devices 410-1, 410-2, . . . , 410-N, etc.) receive the multiplexed media stream, detect the presence of the multiple modified subtitle tracks, and present the subtitle options to the client for selection. When the client selects the "nearly always off" setting at the first client device 410-1, modified subtitle file 1 is chosen, leading to occasional subtitle display, specifically for very unclear words. In contrast, when the clients opt for the "medium" setting on the second client device 410-2 and the "nearly always on" setting on the third client device 410-N, modified subtitle file 2 and modified subtitle file N are chosen, respectively. The variation in selections results in displaying different amounts of subtitles, ranging from showing some unclear phrases to displaying complete sentences when one or more words in the group of words are unclear.

Though FIG. 4 illustrates setting the thresholds for various granularities such as words, phrases, and/or sentences, in some embodiments, the clarity scores are calculated for sentences and the thresholds are used to enable or disable entire sentences in the subtitles. For example, the "nearly always off" setting corresponds to enabling the subtitle display of sentences with the very worst clarity scores, and the "nearly always on" setting corresponds to the subtitle display of all except the clearest sentences. In such embodiments, each of the multiple modified subtitle tracks includes full sentences, and the settings of various thresholds control how many sentences are enabled for subtitle display.

Figure 5A:
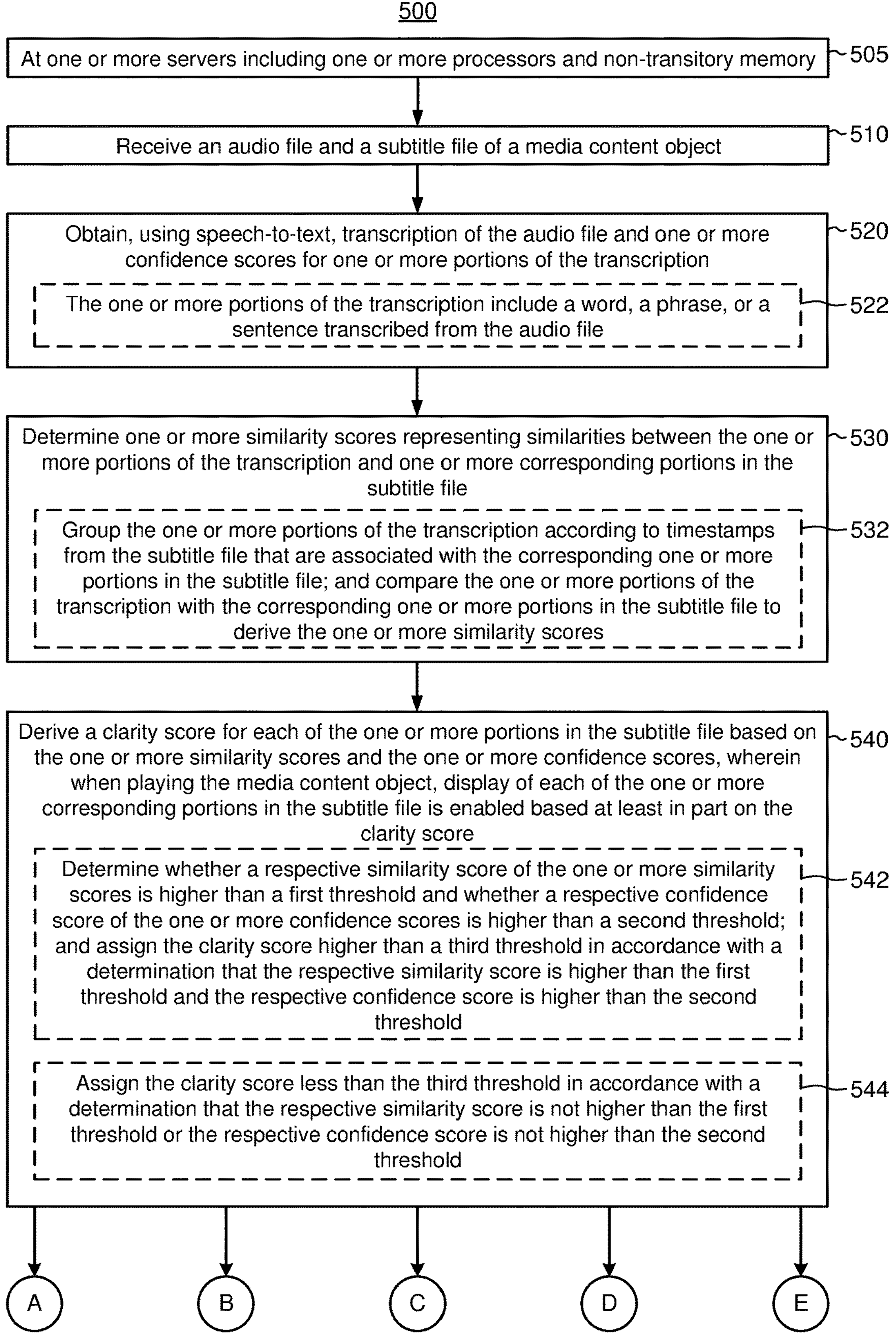

FIGS. 5A and 5B illustrate a flowchart of a method 500 for automatic subtitle enabling in accordance with some embodiments. In FIG. 5A, as represented by block 505, the method 500 is performed at one or more servers that include one or more processors and non-transitory memory, e.g., server(s) hosting the STT unit 120, the text similarity engine 130, and/or the clarity score unit 140 in FIGS. 1 and 1B and/or server(s) hosting the subtitle processing unit 150*a* in FIG. 1. As represented by block 510, the method 500 begins with the one or more servers receiving an audio file and a subtitle file of a media content object, e.g., receiving the audio data by the STT unit 120 in FIGS. 1 and 2 or receiving the subtitles by the text similarity engine 130 in FIGS. 1 and 2.

As represented by block 520, the method 500 continues with the one or more servers obtaining, using speech-to-text, transcription of the audio file and one or more confidence scores for one or more portions of the transcription. For example, as shown in FIGS. 1 and 2, the STT unit 120 transcribes the audio data and outputs the transcription as well as confidence scores for word(s), phrase(s), and/or sentence(s). In some embodiments, as represented by block 522, the one or more portions of the transcription include a word, a phrase, or a sentence transcribed from the audio file, e.g., a word displayed on the client device 410-1, a phrase displayed on the client device 410-2, or a sentence displayed on the client device 410-N shown in FIG. 4.

As represented by block 530, the method 500 also includes determining one or more similarity scores representing similarities between the one or more portions of the transcription and one or more corresponding portions in the subtitle file. In some embodiments, as represented by block 532, the determining includes grouping the one or more portions of the transcription according to timestamps from the subtitle file that are associated with the corresponding one or more portions in the subtitle file; and comparing the one or more portions of the transcription with the corresponding one or more portions in the subtitle file to derive the one or more similarity scores. For example, as shown in FIGS. 1 and 2, the text similarity engine 130 determines similarity scores by comparing the transcription from the STT unit 120 and the original subtitles from the content source 110. When comparing the transcription with the original subtitles, the text similarity engine uses timestamps associated with the transcribed text to group portion(s) of the subtitles, e.g., grouping word(s), phrase(s), and/or sentence(s). Further, the text similarity engine uses the timing information from the original subtitle track to match with the timestamps of the grouped portion(s) to identifying the corresponding portion(s) in the subtitle track. The text similarity engine then compares the identified portions for the determination of the similarity score(s).

As represented by block 540, the method 500 additionally includes deriving a clarity score for each of the one or more portions in the subtitle file based on the one or more similarity scores and the one or more confidence scores, wherein when playing the media content object, display of each of the one or more corresponding portions in the subtitle file is enabled based at least in part on the clarity score. In some embodiments, as represented by block 542, the deriving includes determining whether a respective similarity score of the one or more similarity scores is higher than a first threshold and whether a respective confidence score of the one or more confidence scores is higher than a second threshold; and assigning the clarity score higher than a third threshold in accordance with a determination that the respective similarity score is higher than the first threshold and the respective confidence score is higher than the second threshold. In such embodiments, as represented by block 544, the method 500 further includes assigning the clarity score less than the third threshold in accordance with a determination that the respective similarity score is not higher than the first threshold or the respective confidence score is not higher than the second threshold in accordance with various embodiments. For example, the clarity score unit 140 in FIGS. 1 and 2 combines the confidence score and the similarity score to calculate the clarity score. When both the confidence score and the similarity score are high, the clarity score is also be high. Conversely, when at least one of the confidence score or the similarity score is not high, e.g., a low score or no score, the clarity score is low.

Turning to FIG. 5B, in some embodiments, as represented by block 550, the method 500 further includes identifying one or more portions of the media content object associated with the one or more portions in the subtitle file; obtaining statistics of user interactions with the one or more portions of the media content object; and revising the clarity score based on the statistics of the user interactions. For example, in FIGS. 1 and 2, the clarity score unit 140 refines the clarity score based on external factors. As described above with reference to FIG. 1, the external factors can include statistics of user interactions with the media content, such as rewinding to rewatch a portion of a movie and/or adjusting the volume of a movie scene, etc. Though not shown in FIGS. 1 and 2, in some embodiments, the client devices 160*a* and 160*b* report such user interactions to the server side. In some embodiments, the server side tracks, labels, and/or classifies such user activities to determine the type of revision to the clarity score, e.g., associating rewatching or increasing the volume of a portion of a movie to lowering the clarity score for the portion.

In some embodiments, as represented by block 552, the method 500 further includes revising the clarity score based on one or more of characteristics of the media content, production properties of the media content, and an operator preference. In some embodiments, as represented by block 554, the method 500 further includes rewriting the subtitle file to adjust alpha component of each of the one or more corresponding portions in the subtitle file according to the clarity score and an enabling threshold for determining the display of each of the one or more corresponding portions in the subtitle file. For example, in FIG. 3, with automatic subtitle enabling, when the clarity score for a portion of the subtitles is above a threshold, the server(s) rewrite the alpha component of the TTML subtitle track to hide the portion. On the other hand, when the clarity score for a portion of the subtitles is not above a threshold, the server(s) rewrite the alpha component of the TTML subtitle track to show the portion.

In some embodiments, as represented by block 556, the method 500 further includes generating multiple subtitle files based on the subtitle file, wherein each of the multiple subtitle files is associated with a different enabling threshold for determining the display of each of the one or more corresponding portions in each of the multiple subtitle files. For example, in FIG. 4, several subtitle tracks are available for selection by the viewer with varying thresholds, e.g., ranging from threshold 1 corresponding to "nearly always off" to threshold N corresponding to "nearly always on", etc.

In some embodiments, as represented by block 558, the method 500 further includes transmitting the clarity score to a client device, wherein the clarity score causes the client device to enable or disable the display of each of the one or more corresponding portions in the subtitle file. For example, in FIG. 2, the clarity score is transmitted from the server side to the client side, so that the content player 150*b* can use the clarity score directly for fine grained sensitivity control by the user.

Figure 6:
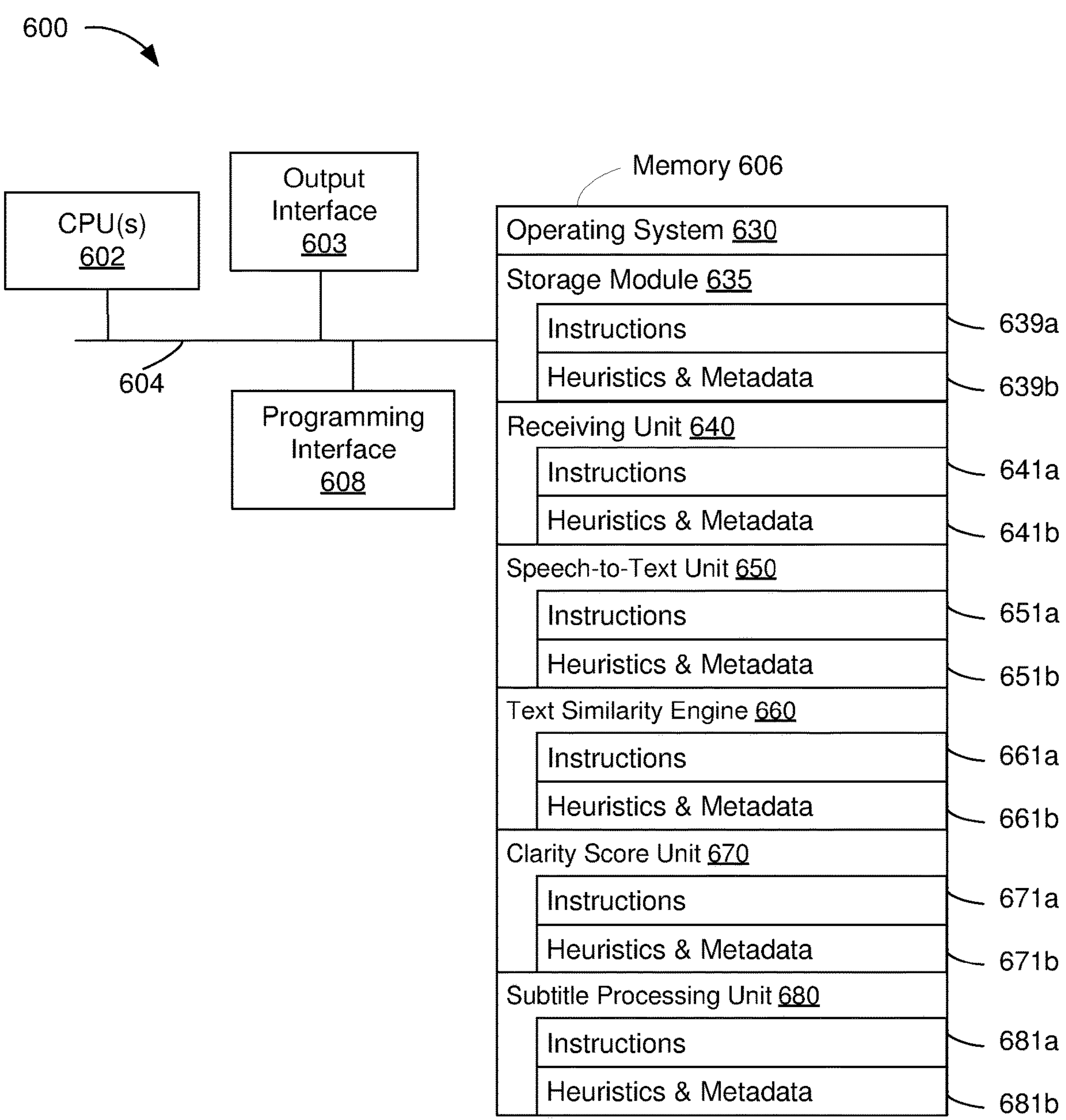
FIG. 6 is a block diagram of a computing device for automatic subtitle enabling, in accordance with some embodiments.

FIG. 6 is a block diagram of a computing device 600 for automatic subtitle enabling in accordance with some embodiments. In some embodiments, the computing device 600 corresponds to the one or more servers hosting the speech-to-text unit 120 (FIGS. 1 and 2), text similarity engine 130 (FIGS. 1 and 2), clarity score unit 140 (FIGS. 1 and 2), and/or subtitle processing unit 150*a* (FIG. 1) and performs one or more of the automatic subtitle enabling functionalities described above. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units 602 (e.g., CPU(s)/GPU(s)), one or more output interfaces 603 (e.g., a network interface for connecting with another computing device), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 635, a receiving unit 640, a speech-to-text unit 650, a text similarity engine 660, a clarity score unit 670, and a subtitle processing unit 680. In some embodiments, one or more instructions are included in a combination of logic and non-transitory memory. The operating system 630 includes procedures for handling various basic system services and for performing hardware dependent tasks.

In some embodiments, the storage module 635 is configured to store and/or manage media content, transcriptions, various scores, and/or various thresholds for subtitle processing. To that end, the storage module 635 includes a set of instructions 639*a* and heuristics and metadata 639*b*.

In some embodiments, the receiving unit 640 is configured to receive media content from a content source and provide the audio files and the subtitle files along with the timing information to the speech-to-text unit 650 and the text similarity engine 660. To that end, the receiving unit 640 includes a set of instructions 641*a* and heuristics and metadata 641*b*.

In some embodiments, the speech-to-text unit 650 is configured to obtain transcriptions of the audio files and confidence scores for the transcriptions. To that end, the speech-to-text unit 650 includes a set of instructions 651*a* and heuristics and metadata 651*b*.

In some embodiments, the text similarity engine 660 is configured to determine similarity scores representing the similarities between the transcriptions and the subtitle files. To that end, the text similarity engine 660 includes a set of instructions 661*a* and heuristics and metadata 661*b*.

In some embodiments, the clarity score unit 670 is configured to derive clarify scores from the confidence scores and similarity scores. To that end, the clarity score unit 670 includes a set of instructions 671*a* and heuristics and metadata 671*b*.

In some embodiments, the subtitle processing unit 680 is configured to rewrite the original subtitles according to the clarity scores for automatic subtitle enabling. To that end, the subtitle processing unit 680 includes a set of instructions 681*a* and heuristics and metadata 681*b*.

Although the storage module 635, the receiving unit 640, the speech-to-text unit 650, the text similarity engine 660, the clarity score unit 670, and the subtitle processing unit 680 are illustrated as residing on a single computing device 600, it should be understood that in other embodiments, any combination of the storage module 635, the receiving unit 640, the speech-to-text unit 650, the text similarity engine 660, the clarity score unit 670, and the subtitle processing unit 680 can reside in separate computing devices in various embodiments. For example, in some embodiments, each of the storage module 635, the receiving unit 640, the speech-to-text unit 650, the text similarity engine 660, the clarity score unit 670, and the subtitle processing unit 680 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:

at one or more servers including one or more processors and non-transitory memory:

receiving an audio file and a subtitle file of a media content object;

obtaining, using speech-to-text at the one or more servers, transcription of the audio file and one or more confidence scores for one or more portions of the transcription;

determining one or more similarity scores representing similarities between the one or more portions of the transcription and one or more corresponding portions in the subtitle file;

deriving a clarity score at the one or more servers for each of the one or more portions in the subtitle file based on the one or more similarity scores and the one or more confidence scores; and transmitting the audio file, the subtitle file, and the clarity score to a client device, wherein when playing the media content object and displaying the subtitle file at the client device, display of each of the one or more corresponding portions is shown or hidden by adjusting one or more display properties of a respective portion in the subtitle file based at least in part on the clarity score.

2. The method of claim 1, wherein the one or more portions of the transcription include a word, a phrase, or a sentence transcribed from the audio file.

3. The method of claim 1, wherein determining the one or more similarity scores representing the similarities between the one or more portions of the transcription and the corresponding one or more portions in the subtitle file includes:

grouping the one or more portions of the transcription according to timestamps from the subtitle file that are associated with the corresponding one or more portions in the subtitle file; and comparing the one or more portions of the transcription with the corresponding one or more portions in the subtitle file to derive the one or more similarity scores.

4. The method of claim 1, wherein deriving the clarity score for each of the one or more portions in the subtitle file based on the one or more similarity scores and the one or more confidence scores includes:

determining whether a respective similarity score of the one or more similarity scores is higher than a first threshold and whether a respective confidence score of the one or more confidence scores is higher than a second threshold; and assigning the clarity score higher than a third threshold in accordance with a determination that the respective similarity score is higher than the first threshold and the respective confidence score is higher than the second threshold.

5. The method of claim 4, further comprising:

assigning the clarity score less than the third threshold in accordance with a determination that the respective similarity score is not higher than the first threshold or the respective confidence score is not higher than the second threshold.

6. The method of claim 1, further comprising:

identifying one or more portions of the media content object associated with the one or more portions in the subtitle file;

obtaining statistics of user interactions with the one or more portions of the media content object; and revising the clarity score based on the statistics of the user interactions.

7. The method of claim 1, further comprising:

revising the clarity score based on one or more of characteristics of the media content, production properties of the media content, and an operator preference.

8. The method of claim 1, further comprising:

rewriting the subtitle file to adjust alpha component of each of the one or more corresponding portions in the subtitle file according to the clarity score and an enabling threshold for determining the display of each of the one or more corresponding portions in the subtitle file.

9. The method of claim 1, further comprising:

generating multiple subtitle files based on the subtitle file, wherein each of the multiple subtitle files is associated with a different enabling threshold for determining the display of each of the one or more corresponding portions in each of the multiple subtitle files.

10. The method of claim 1, wherein:

the one or more display properties include an alpha component of the subtitle file; and transmitting the clarity score to the client device causes the client device to update the alpha component for each of the one or more corresponding portions in the subtitle file.

11. A non-transitory memory storing one or more programs, which, when executed by one or more servers with one or more processors, cause the one or more servers to:

receive an audio file and a subtitle file of a media content object;

obtain, using speech-to-text at the one or more servers, transcription of the audio file and one or more confidence scores for one or more portions of the transcription;

determine one or more similarity scores representing similarities between the one or more portions of the transcription and one or more corresponding portions in the subtitle file;

derive a clarity score at the one or more servers for each of the one or more portions in the subtitle file based on the one or more similarity scores and the one or more confidence scores; and transmit the audio file, the subtitle file, and the clarity score to a client device, wherein when playing the media content object and displaying the subtitle file at the client device, display of each of the one or more corresponding portions is shown or hidden by adjusting one or more display properties of a respective portion in the subtitle file based at least in part on the clarity score.

12. The non-transitory memory of claim 11, wherein the one or more portions of the transcription include a word, a phrase, or a sentence transcribed from the audio file.

13. The non-transitory memory of claim 11, wherein determining the one or more similarity scores representing the similarities between the one or more portions of the transcription and the corresponding one or more portions in the subtitle file includes:

grouping the one or more portions of the transcription according to timestamps from the subtitle file that are associated with the corresponding one or more portions in the subtitle file; and comparing the one or more portions of the transcription with the corresponding one or more portions in the subtitle file to derive the one or more similarity scores.

14. The non-transitory memory of claim 11, wherein deriving the clarity score for each of the one or more portions in the subtitle file based on the one or more similarity scores and the one or more confidence scores includes:

determining whether a respective similarity score of the one or more similarity scores is higher than a first threshold and whether a respective confidence score of the one or more confidence scores is higher than a second threshold; and assigning the clarity score higher than a third threshold in accordance with a determination that the respective similarity score is higher than the first threshold and the respective confidence score is higher than the second threshold.

15. The non-transitory memory of claim 14, wherein the one or more programs further cause the one or more servers to:

assign the clarity score less than the third threshold in accordance with a determination that the respective similarity score is not higher than the first threshold or the respective confidence score is not higher than the second threshold.

16. The non-transitory memory of claim 11, wherein the one or more programs further cause the one or more servers to:

identify one or more portions of the media content object associated with the one or more portions in the subtitle file;

obtain statistics of user interactions with the one or more portions of the media content object; and revise the clarity score based on the statistics of the user interactions.

17. The non-transitory memory of claim 11, wherein the one or more programs further cause the one or more servers to:

revise the clarity score based on one or more of characteristics of the media content, production properties of the media content, and an operator preference.

18. The non-transitory memory of claim 11, wherein the one or more programs further cause the one or more servers to:

rewrite the subtitle file to adjust alpha component of each of the one or more corresponding portions in the subtitle file according to the clarity score and an enabling threshold for determining the display of each of the one or more corresponding portions in the subtitle file.

19. The non-transitory memory of claim 11, wherein the one or more programs further cause the one or more servers to:

generate multiple subtitle files based on the subtitle file, wherein each of the multiple subtitle files is associated with a different enabling threshold for determining the display of each of the one or more corresponding portions in each of the multiple subtitle files.

20. A server comprising:

one or more processors;

a non-transitory memory;

a network interface; and one or more programs, stored in the non-transitory memory, which, when executed by the one or more processors, cause the server to:

receive an audio file and a subtitle file of a media content object;

obtain, using speech-to-text at the server, transcription of the audio file and one or more confidence scores for one or more portions of the transcription;

determine one or more similarity scores representing similarities between the one or more portions of the transcription and one or more corresponding portions in the subtitle file;

derive a clarity score at the server for each of the one or more portions in the subtitle file based on the one or more similarity scores and the one or more confidence scores; and transmit the audio file, the subtitle file, and the clarity score to a client device, wherein when playing the media content object and displaying the subtitle file at the client device, display of each of the one or more corresponding portions is shown or hidden by adjusting one or more display properties of a respective portion in the subtitle file based at least in part on the clarity score.

* * * * *